US012718258B2

(12) United States Patent
Haletky et al.

(10) Patent No.: US 12,718,258 B2
(45) **Date of Patent: *Aug. 25, 2026**

(54) DISTRIBUTED LEDGERS FOR ENHANCED CHAIN OF CUSTODY CERTIFICATION

(71) Applicant: Bank of America Corporation, Charlotte, NC (US)

(72) Inventors: Edward L. Haletky, Austin, TX (US); Amanda Jane Adams, Flint (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/901,668

(22) Filed: Sep. 30, 2024

(65) Prior Publication Data

US 2025/0021997 A1 Jan. 16, 2025

Related U.S. Application Data

(63) Continuation of application No. 18/371,166, filed on Sep. 21, 2023, now Pat. No. 12,147,993, which is a (Continued)

(51) Int. Cl.
*G06Q 30/018* (2023.01)
*G06F 16/22* (2019.01)
(Continued)

(52) U.S. Cl.
CPC ..... *G06Q 30/0185* (2013.01); *G06F 16/2255* (2019.01); *G06F 16/27* (2019.01);
(Continued)

(58) Field of Classification Search
CPC .. G06Q 30/0185; G06Q 10/10; G06Q 50/265; G06F 16/2255; G06F 16/27; G06F 21/6218; G06F 21/64
See application file for complete search history.

(56) References Cited

U.S. PATENT DOCUMENTS 8,171,108 B2 5/2012 Shannon et al.
9,641,342 B2 5/2017 Sriram et al.
(Continued)

FOREIGN PATENT DOCUMENTS

BR 102020009344 A2 11/2021
KR 102222857 B1 * 3/2021 ............... H04L 9/50
(Continued)

OTHER PUBLICATIONS

Duy, "Ensuring integrity and tamper resistance of log files for forensic using blockchain" (Year: 2019).*
(Continued)

*Primary Examiner* — Sangeeta Bahl
(74) *Attorney, Agent, or Firm* — Banner & Witcoff, Ltd.

(57) ABSTRACT

Aspects of the disclosure relate to enhanced chain of custody certification. A computing platform may establish, within a period of time of receiving data, a first distributed ledger that includes the data. The computing platform may receive a request to access the data. The computing platform may compute a first hash of the data indicating a state of the data prior to being accessed, and may record the first hash in a second distributed ledger. After granting data access, the computing platform may receive first information indicating actions performed on the data and second information indicating reasons for accessing the data. The computing platform may compute a second hash of the data indicating a state of the data after being accessed, and may record the second hash and the second information in the second distributed ledger. The computing platform may record, in a third distributed ledger, the first information.

20 Claims, 9 Drawing Sheets

Related U.S. Application Data continuation of application No. 17/034,418, filed on Sep. 28, 2020, now Pat. No. 11,803,864.

(51) Int. Cl.
*G06F 16/27* (2019.01)
*G06F 21/62* (2013.01)
*G06Q 10/10* (2023.01)
*G06Q 50/26* (2024.01)

(52) U.S. Cl.
CPC ......... *G06F 21/6218* (2013.01); *G06Q 10/10* (2013.01); *G06Q 50/265* (2013.01)

(56) References Cited

U.S. PATENT DOCUMENTS

| | | | |
|---|---|---|---|
| 9,760,697 | B1 | 9/2017 | Walker |
| 9,794,074 | B2 | 10/2017 | Toll et al. |
| 9,849,364 | B2 | 12/2017 | Tran et al. |
| 9,965,805 | B1 | 5/2018 | Winklevoss et al. |
| 10,022,613 | B2 | 7/2018 | Tran et al. |
| 10,033,702 | B2 | 7/2018 | Ford et al. |
| 10,046,228 | B2 | 8/2018 | Tran et al. |
| 10,084,607 | B2 | 9/2018 | Toll et al. |
| 10,097,356 | B2 | 10/2018 | Zinder |
| 10,102,510 | B2 | 10/2018 | Yau et al. |
| 10,108,811 | B1 | 10/2018 | Walker |
| 10,140,470 | B2 | 11/2018 | Kurian et al. |
| 10,187,754 | B1 | 1/2019 | Hansen |
| 10,195,513 | B2 | 2/2019 | Tran et al. |
| 10,230,526 | B2 | 3/2019 | Manning |
| 10,231,077 | B2 | 3/2019 | Raduchel et al. |
| 10,262,140 | B2 | 4/2019 | Smith et al. |
| 10,282,711 | B2 | 5/2019 | Chan et al. |
| 10,325,257 | B1 | 6/2019 | Winklevoss et al. |
| 10,354,236 | B1 | 7/2019 | Wang |
| 10,362,278 | B1 | 7/2019 | Palazzolo et al. |
| 10,373,129 | B1 | 8/2019 | James et al. |
| 10,373,158 | B1 | 8/2019 | James et al. |
| 10,425,426 | B1 | 9/2019 | Simons |
| 10,433,117 | B2 | 10/2019 | Hansen |
| 10,438,290 | B1 | 10/2019 | Winklevoss et al. |
| 10,452,781 | B2 | 10/2019 | Verma |
| 10,469,492 | B2 | 11/2019 | Hall |
| 10,510,441 | B2 | 12/2019 | Wall Warner et al. |
| 10,530,580 | B1 | 1/2020 | Walker |
| 10,532,268 | B2 | 1/2020 | Tran et al. |
| 10,540,640 | B1 | 1/2020 | James et al. |
| 10,540,653 | B1 | 1/2020 | James et al. |
| 10,540,654 | B1 | 1/2020 | James et al. |
| 10,541,821 | B2 | 1/2020 | Toll et al. |
| 10,546,133 | B2 | 1/2020 | Griffin et al. |
| 10,546,277 | B2 | 1/2020 | Metnick et al. |
| 10,552,829 | B2 | 2/2020 | Wilkins et al. |
| 10,558,955 | B2 | 2/2020 | Haldenby et al. |
| 10,581,847 | B1 | 3/2020 | Sun et al. |
| 10,581,869 | B2 | 3/2020 | Simons |
| 10,600,050 | B1 | 3/2020 | Anton et al. |
| 10,630,485 | B2 | 4/2020 | Zinder |
| 10,635,801 | B2 | 4/2020 | Tovey et al. |
| 10,650,313 | B2 | 5/2020 | Ackerman et al. |
| 10,650,376 | B1 | 5/2020 | Winklevoss et al. |
| 10,677,886 | B2 | 6/2020 | Meadow |
| 10,681,133 | B2 | 6/2020 | Puleston et al. |
| 10,693,643 | B2 | 6/2020 | Serres et al. |
| 10,716,052 | B2 | 7/2020 | Coney |
| 10,740,754 | B2 | 8/2020 | Rafalko |
| 10,764,254 | B2 | 9/2020 | Ford et al. |
| 11,223,487 | B2 * | 1/2022 | Weng ........................ H04L 9/50 |
| 11,334,882 | B1 | 5/2022 | Jameson et al. |
| 11,481,509 | B1 | 10/2022 | Prasad et al. |
| 2003/0187873 | A1 | 10/2003 | Paffe et al. |
| 2019/0013934 | A1 | 1/2019 | Mercuri et al. |
| 2019/0130190 | A1 | 5/2019 | Raspotnik, Jr. |
| 2019/0318128 | A1 | 10/2019 | Ackerman et al. |
| 2020/0159891 | A1 | 5/2020 | Patel et al. |
| 2020/0226233 | A1 | 7/2020 | Penugonda et al. |
| 2020/0226267 | A1 | 7/2020 | Bengston |
| 2020/0228352 | A1 * | 7/2020 | Yang ....................... H04L 9/321 |
| 2020/0336907 | A1 | 10/2020 | Jain |
| 2021/0014065 | A1 | 1/2021 | Gourisetti et al. |

FOREIGN PATENT DOCUMENTS

| | | | | |
|---|---|---|---|---|
| WO | WO-2018032376 A1 * | 2/2018 | ............. | G06F 21/64 |
| WO | WO-2020021228 A1 * | 1/2020 | ........... | H04L 9/3239 |

OTHER PUBLICATIONS

Chopade, "Digital forensic maintaining chain of custody using blockchain" (Year: 2019).*

Lester Obbayi "Computer Forensics: Chain of Custody" Infosec https://resources.infosecinstitute.com/category/computerforensics/introduction/areas-of-study/legal-and-ethical-principles/chain-of-custody-in-computer-forensics/#gref website visited Sep. 1, 2020, pp. 1-9.

Liza Ahmad et al. "Blockchain-based Chain of Custody" Aug. 2020, pp. 1-9.

Mar. 3, 2023—(US) Non Final Office Action—U.S. Appl. No. 17/034,418.

Amritraj Singh et al. "Sidechain technologies in blockchain networks: An examination and state-of-the-art review" Journal of Network and Computer Applications, Year 2019, pp. 1-16.

Aug. 31, 2023—(US) Notice of Allowance—U.S. Appl. No. 17/034,418.

Yunianto et al., "B-Dec: Digital evidence cabinet based on blockchain for evidence management" (Mar. 2019), pp. 1-9.

Victoria L. Lemieux et al. "Blockchain Technology & Recordkeeping" ARMA Canada Region, ARMA International Education Foundation, May 30, 2019, 139 pages.

* cited by examiner

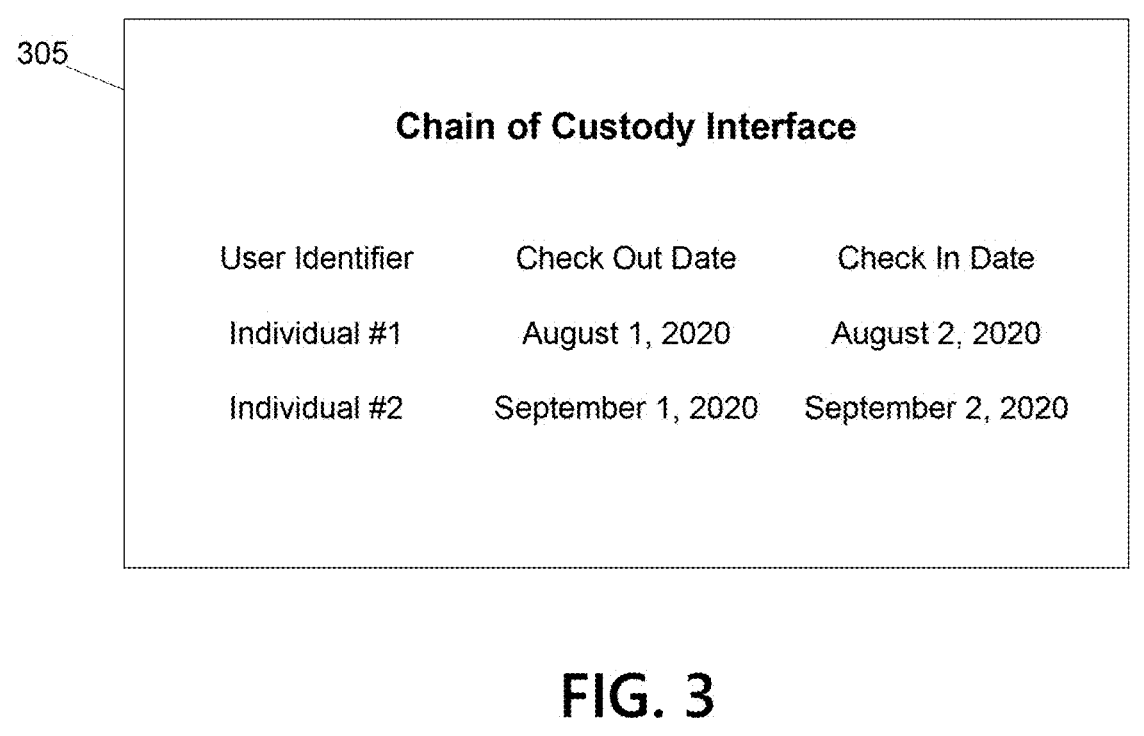

| User Identifier | Check Out Date | Check In Date |
|---|---|---|
| Individual #1 | August 1, 2020 | August 2, 2020 |
| Individual #2 | September 1, 2020 | September 2, 2020 |

FIG. 3

DISTRIBUTED LEDGERS FOR ENHANCED CHAIN OF CUSTODY CERTIFICATION

CROSS REFERENCE TO RELATED APPLICATIONS

This application is a continuation of U.S. Ser. No. 18/371,166, filed Sep. 21, 2023 and is a continuation of U.S. Ser. No. 17/034,418, filed Sep. 28, 2020, and entitled "Distributed Ledgers for Enhanced Chain of Custody Certification," which is incorporated herein by reference in its entirety.

BACKGROUND

Aspects of the disclosure relate to ensuring data integrity in automated data collection. In particular, one or more aspects of the disclosure relate to computing platforms that maintain chain of custody records.

In some cases, enterprise organizations may automatically collect forensics data and may maintain a corresponding chain of custody. In some instances, digital signatures may be used to establish and maintain the chain of custody. Such methods may be useful, but there may be time gaps between when the forensics data is automatically gathered and these signatures may be applied. In some instances, malicious actors may use these time gaps to modify or otherwise alter the forensics data, while remaining undetected. Accordingly, enterprise organizations may be vulnerable to manipulation of automatically gathered forensics data, which may result in reduced data integrity and data that might not be trusted by external entities (e.g., law enforcement) who may wish to analyze the forensics data.

SUMMARY

Aspects of the disclosure provide effective, efficient, scalable, and convenient technical solutions that address and overcome the technical problems associated with certification of distributed ledgers in automated data gathering. In accordance with one or more embodiments of the disclosure, a computing platform comprising at least one processor, a communication interface, and memory storing computer-readable instructions may receive, from one or more computing devices, forensics data. The computing platform may establish, within a predetermined period of time of receiving the forensics data, a first distributed ledger that includes the forensics data. The computing platform may receive, from an enterprise user device, a request to access the forensics data. The computing platform may compute a first hash of the forensics data indicating a state of the forensics data prior to being accessed by the enterprise user device. The computing platform may record, in a second distributed ledger linked to the first distributed ledger, the first hash. The computing platform may grant the enterprise user device access to the forensics data. The computing platform may receive, from the enterprise user device, first chain of custody information indicating actions performed on the forensics data and second chain of custody information indicating at least one reason for accessing the forensics data. The computing platform may compute a second hash of the forensics data indicating a state of the forensics data after being accessed by the enterprise user device. The computing platform may record, in the second distributed ledger, the second hash and the second chain of custody information indicating the at least one reason for accessing the forensics data. The computing platform may record, in a third distributed ledger linked to the first distributed ledger, the first chain of custody information indicating the actions performed on the forensics data.

In one or more instances, the computing platform may receive, from an external forensics analysis system, a request to access the forensics data. The computing platform may grant the external forensics analysis system access to the forensics data, the first chain of custody information, and the second chain of custody information, where granting the external forensics analysis system access to the forensics data, the first chain of custody information, and the second chain of custody information causes the external forensics analysis system to display the forensics data, the first chain of custody information, and the second chain of custody information.

In one or more instances, the computing platform may grant the external forensics analysis system access to the forensics data along with the chain of custody information by: 1) recording, in a fourth distributed ledger linked to the first distributed ledger, the forensics data, the first chain of custody information indicating actions performed on the forensics data, the second chain of custody information indicating at least one reason for accessing the forensics data, the first hash, and the second hash, and 2) granting the external forensics analysis system access to the fourth distributed ledger.

In one or more instances, the external forensics analysis system may be configured to be used by a law enforcement agency. In one or more instances, the computing platform and the enterprise user device may be operating on an internal enterprise network.

In one or more instances, the one or more computing devices may include one or more of: one or more physical computing devices or one or more virtual computing devices. In one or more instances, the first distributed ledger may be established at substantially the same time as the forensics data is received.

In one or more instances, the forensics data may be received using one or more automated data gathering methods. In one or more instances, the request to access the forensics data may correspond to one or more of a request for an encryption key, a request to decrypt a disk, a request to identify a user, a request to identify a system, a request to modify the forensics data, carving out disc abnormalities to identify broken virtual disks, or a request to identify a timestamp.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 depicts an illustrative graphical user interface for implementing distributed ledgers for enhanced certification of chain of custody data in accordance with one or more example embodiments.

DETAILED DESCRIPTION

Figure 1A:
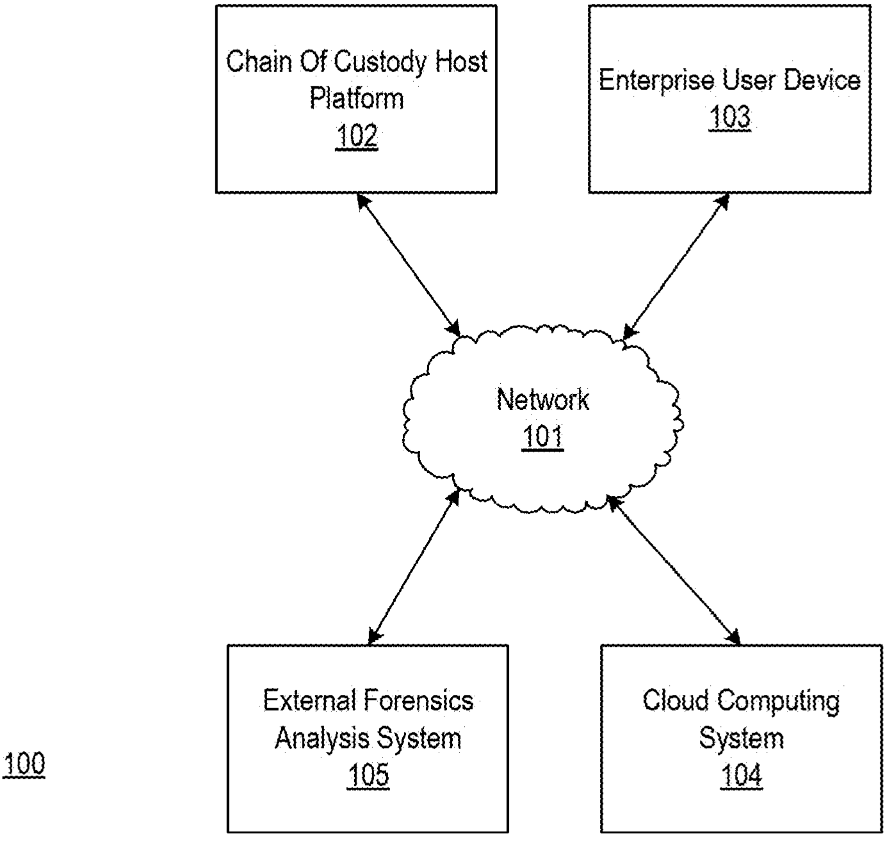
FIGS. 1A-1B depict an illustrative computing environment for implementing distributed ledgers for enhanced certification of chain of custody data in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to using distributed ledgers for enhanced certification of chain of custody data. For example, when gathering data automatically, there is potential for breaks in the chain of custody. In some instances, digital signatures may be used to track the chain of custody. It may be important, however, to certify that automatically generated data is correct and has not been modified prior to the application of such signatures.

In instances where forensics automation is used to collect data, automation may generate entities within a blockchain that ensures data cannot be modified and that remove the manual step of certifying the data after data collection. In addition, further use of automation may create side chains and/or new forensic artifacts to show when data is checked out. In doing so, an unbroken chain of custody may be created from when a first bit is collected (either by manual or automated means). Additionally, a side chain may show access to any artifact with the blockchain, and may be used to further add new artifacts to the blockchain.

To do so, tools used to gather or investigate data gathered may be tied into the blockchain and any side chains to ensure proper chain of custody. This takes advantage of the data tracking mechanisms that show when data is referenced or changed in any form. Furthermore, this may limit certification to proper data gathering processes for specific data to be gathered instead of certifying the data after collection.

In some instances, side chains may continue to grow, which may in effect create a sub chain of immutable processing as it occurs. Additionally or alternatively, the side chains may run just for the length of time needed for processing and results may be pushed into the main blockchain as new blocks. Furthermore, due to the nature of blockchains, side chains may maintain the chain of custody for all usage of an artifact within the main blockchain (e.g., if a copy of an artifact is made, the side chain may record such copies).

In doing so, one or more of the systems and methods described herein may provide technical solutions to technical problems related to chain of custody for automatically gathered forensics data. For example, one or more of the systems and methods described herein may close the gap between human and machine interaction to ensure data gathered forensically is not manipulated en route to storage by unknown third parties. Furthermore, one or more of the systems and methods described herein may ensure that information indicating exactly who (user or machine) did what, when, where, why, and how for data gathered for forensic or incident response use. In addition, new derived artifacts from existing data may become part of the record for future forensics uses.

Figure 1B:
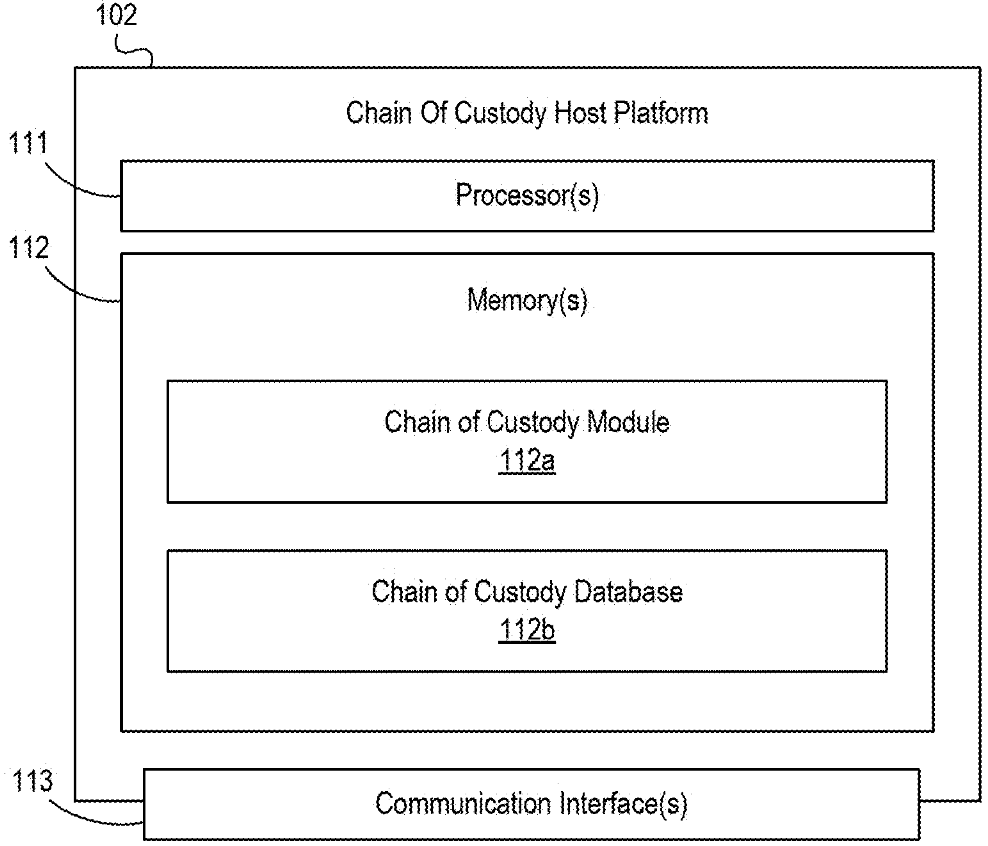

FIGS. 1A-1B depict an illustrative computing environment that implements distributed ledgers for enhanced certification of chain of custody data in accordance with one or more example embodiments. Referring to FIG. 1A, computing environment 100 may include one or more computer systems. For example, computing environment 100 may include a chain of custody host platform 102, an enterprise user device 103, a cloud computing system 104, and an external forensics analysis system 105.

As described further below, chain of custody host platform 102 may be a computer system that includes one or more computing devices (e.g., servers, server blades, or the like) and/or other computer components (e.g., processors, memories, communication interfaces) that may be used to host and maintain one or more distributed ledgers that may be used to track chain of custody data related to automated data collection. For example, the chain of custody host platform 102 may be configured to host a main blockchain that contains forensics data, and one or more sub-chains linked to the main blockchain that each store chain of custody information related to the forensics data.

Enterprise user device 103 may be a laptop computer, desktop computer, mobile device, tablet, smartphone, or the like that may be used by an individual such as an employee of an enterprise organization (e.g., a financial institution). For example, the enterprise user device 103 may be used by one or more individuals to access and/or otherwise maintain forensics data. In some instances, the enterprise user device 103 may be configured to communicate with the chain of custody host platform 102 to provide the forensics data. In some instances, the enterprise user device 103 may host one or more forensics computer processes and may perform one or more automated and/or manual forensics tasks. In some instances, enterprise user device 103 may be configured to display one or more user interfaces (e.g., forensics data interfaces). In some instances, the enterprise user device 103 may be operating on the same internal enterprise network as the chain of custody host platform 102.

Cloud computing system 104 may include one or more computing devices and/or other computer components (e.g., processors, memories, communication interfaces). In some instances, the cloud computing system 104 may be configured to host one or more virtual machines that may be used to automatically provide forensics data to the chain of custody host platform 102. In some instances, the cloud computing system 104 may host one or more virtual machines that may be used to automatically access and/or otherwise maintain forensics data from the chain of custody host platform 102. In some instances, the cloud computing system 104 may host one or more forensics computer processes and may perform one or more automated and/or manual forensics tasks.

External forensics analysis system 105 may be a laptop computer, desktop computer, mobile device, tablet, smartphone, or the like that may be configured to be used by an individual such as an employee of a law enforcement agency. For example, the external forensics analysis system 105 may be used by one or more individuals to access and/or otherwise analyze forensics data and chain of custody information. In some instances, enterprise user device 103 may be configured to display one or more user interfaces (e.g., forensics data and/or chain of custody interfaces).

Computing environment 100 also may include one or more networks, which may interconnect chain of custody host platform 102, enterprise user device 103, cloud computing system 104, and/or external forensics analysis system 105. For example, computing environment 100 may include a network 101 (which may interconnect, e.g., chain of custody host platform 102, enterprise user device 103, cloud computing system 104, and/or external forensics analysis system 105).

In one or more arrangements, chain of custody host platform 102, enterprise user device 103, cloud computing system 104, and/or external forensics analysis system 105 may be any type of computing device capable of sending and/or receiving requests and processing the requests accordingly. For example, chain of custody host platform 102, enterprise user device 103, cloud computing system 104, external forensics analysis system 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data chain of custody host platform 102, enterprise user device 103, cloud computing system 104, and/or external forensics analysis system 105, may, in some instances, be special-purpose computing devices configured to perform specific functions.

Referring to FIG. 1B, chain of custody host platform 102 may include one or more processors 111, memory 112, and communication interface 113. A data bus may interconnect processor 111, memory 112, and communication interface 113. Communication interface 113 may be a network interface configured to support communication between chain of custody host platform 102 and one or more networks (e.g., network 101, or the like). Memory 112 may include one or more program modules having instructions that when executed by processor 111 cause chain of custody host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of chain of custody host platform 102 and/or by different computing devices that may form and/or otherwise make up chain of custody host platform 102. For example, memory 112 may have, host, store, and/or include chain of custody module **112*a* and a chain of custody database 112*b***.

Chain of custody module **112*a* may have instructions that direct and/or cause chain of custody host platform 102 to generate distributed ledgers to provide enhanced certification of chain of custody information, as discussed in greater detail below. Chain of custody database 112*b* may store information used by chain of custody module 112*a* and/or chain of custody host platform 102** in application of advanced techniques to provide one or more distributed ledgers, and/or in performing other functions.

Figure 2A:
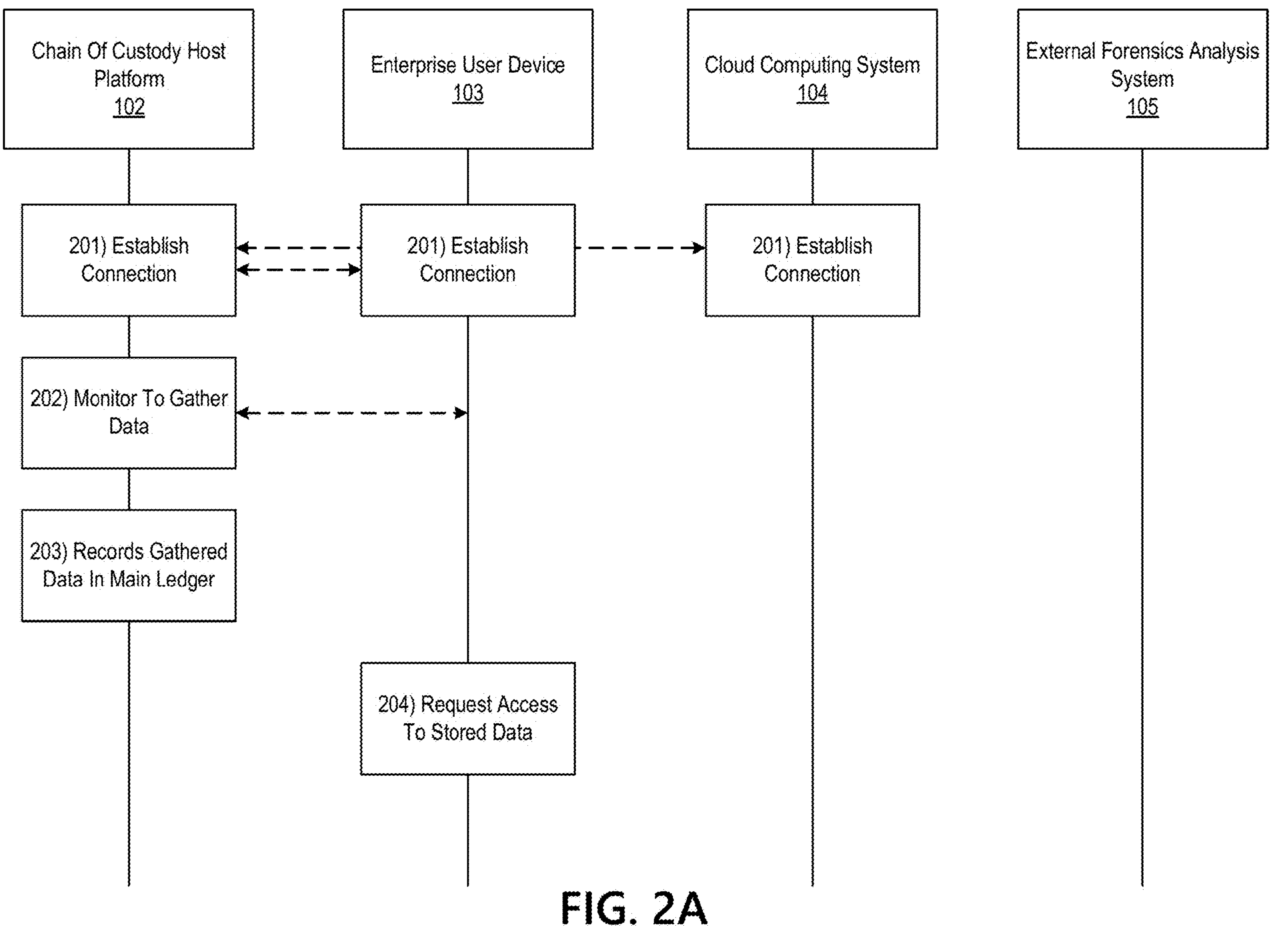
FIGS. 2A-2E depict an illustrative event sequence for implementing distributed ledgers for enhanced certification of chain of custody data in accordance with one or more example embodiments.

FIGS. 2A-2E depict an illustrative event sequence implementing distributed ledgers for enhanced certification of chain of custody data in accordance with one or more example embodiments. Referring to FIG. 2A, at step 201, the chain of custody host platform 102 may establish connections with the enterprise user device 103 and/or the cloud computing system 104. For example, the chain of custody host platform 102 may establish a first wireless data connection with the enterprise user device 103 to link the chain of custody host platform 102 to the enterprise user device 103 and/or a second wireless data connection with the cloud computing system 104 to link the chain of custody host platform 102 to the cloud computing system 104.

At step 202, the chain of custody host platform 102 may monitor the enterprise user device 103 and/or the cloud computing system 104 to gather forensics data. In some instances, the chain of custody host platform 102 may automatically gather (e.g., using one or more automated data gathering methods) the forensics data without receiving user input prompting to initiate data gathering. In some instances, in gathering the forensics data, the chain of custody host platform 102 may gather data corresponding to one or more of: memory disks, new write information, instructions, screenshots, and/or other stored data. In some instances, in gathering the forensics data, the chain of custody host platform 102 may gather raw and/or derived forensics data.

In some instances, the chain of custody host platform 102 may gather the forensics data from the enterprise user device 103 via the communication interface 113 and while the first wireless data connection is established. Additionally or alternatively, the chain of custody host platform 102 may gather the forensics data from the cloud computing system 104 via the communication interface 113 and while the second wireless data connection is established.

At step 203, the chain of custody host platform 102 may establish a first distributed ledger using the forensics data gathered at step 202. For example, the chain of custody host platform 102 may establish a first blockchain that includes the forensics data. In some instances, in establishing the first distributed ledger, the chain of custody host platform 102 may store the forensics data itself and/or a pointer to immutable storage that contains the forensics data. In some instances, the chain of custody host platform 102 may record the forensics data in the first distributed ledger immediately (e.g., at substantially the same time or within some other predetermined period of time) as the forensics data is gathered (e.g., steps 202 and 203 may be performed simultaneously). In some instances, in establishing the first distributed ledger, the chain of custody host platform 102 may establish one or more blocks that include one or more of a system of origin, a user identifier of origin, a service identifier of origin, a block type (e.g., memory, disk, network, or other type), initial artifact notes, and/or other information corresponding to the forensics data.

By establishing the chain of custody in this way, the chain of custody host platform 102 may eliminate the time gap (which e.g., could be several hours or even several days) where data could be changed without being recorded in the chain of custody. For example, by automatically establishing the chain of custody immediately upon collecting data, the chain of custody host platform 102 may establish a chain of custody without manual intervention. In doing so, the chain of custody host platform 102 may attest to the integrity of the forensics data regardless of the fact that it may be checked out and back in as described further below.

At step 204, the enterprise user device 103 may receive a request to access the stored forensics data. In some instances, the enterprise user device 103 may receive the request to access the stored forensics data while executing one or more manual and/or automated tasks such as one or more of finding encryption keys, decrypting a disc, finding user identifiers, finding system identifiers, recording data modifications, carving out abnormalities in discs to identify broken virtual discs/files, finding common timestamps, validating tasks, and/or other tasks.

Figure 2B:
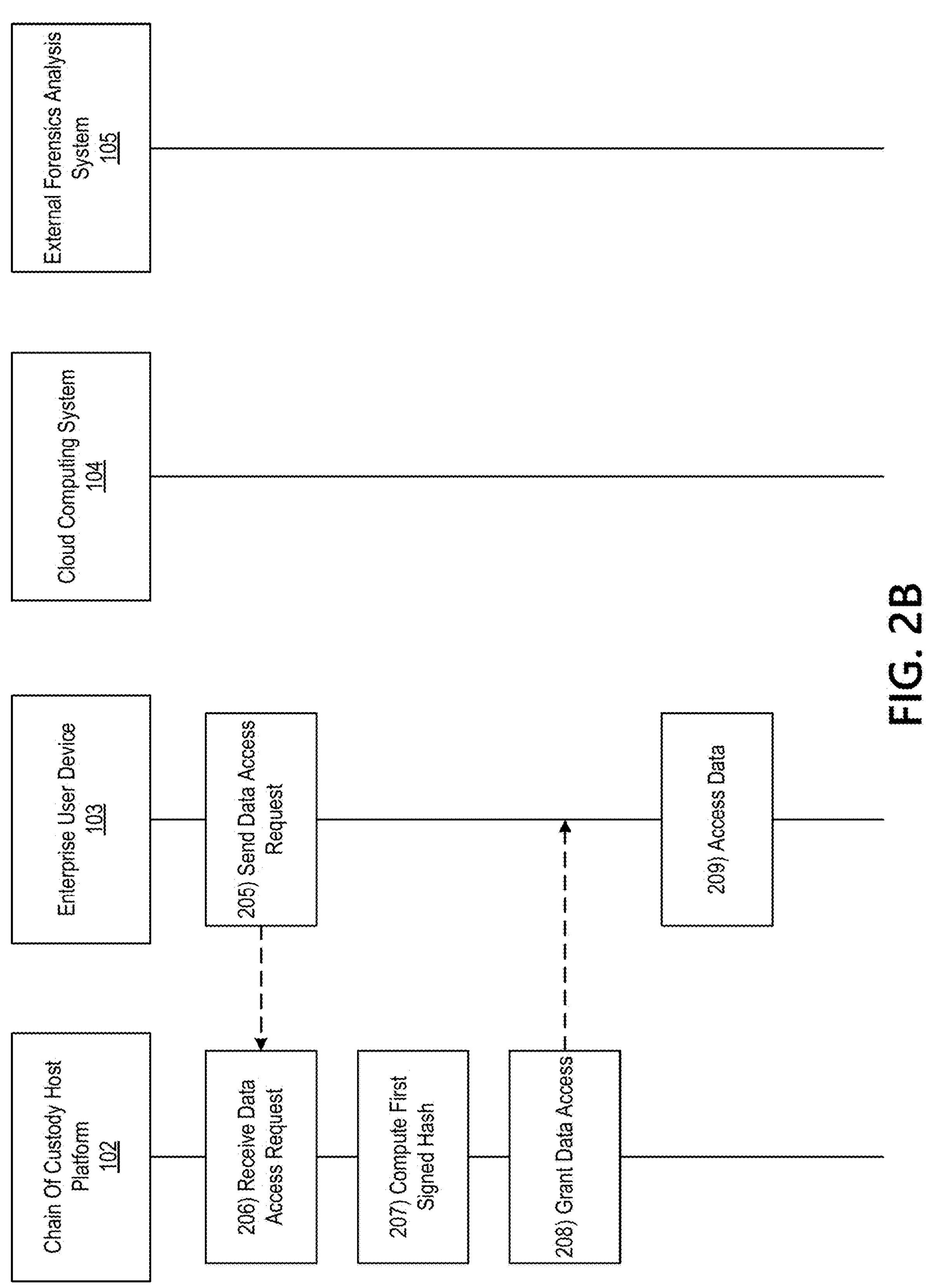

Referring to FIG. 2B, at step 205, the enterprise user device 103 may send a data access request to the chain of custody host platform 102. In some instances, the enterprise user device 103 may send the data access request to the chain of custody host platform 102 while the first wireless data connection is established.

At step 206, chain of custody host platform 102 may receive the data access request sent at step 205. In some instances, the chain of custody host platform 102 may receive the data access request via the communication interface 113 and while the first wireless data connection is established.

At step 207, based on or in response to receiving the data access request at step 206, the chain of custody host platform 102 may compute a first signed hash of the requested forensics data. For example, the chain of custody host platform 102 may compute the first signed hash to preserve a state of the requested forensics data before access is granted to the enterprise user device 103. In some instances, the chain of custody host platform 102 may establish a second distributed ledger linked to the first distributed ledger. For example, the chain of custody host platform 102 may establish a first sidechain to the main blockchain. In some instances, in establishing the second distributed ledger, the chain of custody host platform 102 may establish one or more blocks that include one or more of a user identifier, a service identifier, system access information, access notes, the first signed hash, and/or other information corresponding to the forensics data. In these instances, the chain of custody host platform 102 may record the first signed hash, an identifier for the enterprise user device 103, and/or an indication that the requested forensics data has been checked out.

At step 208, the chain of custody host platform 102 may grant the enterprise user device 103 access to the requested forensics data. In some instances, to do so, the chain of custody host platform 102 may grant the enterprise user device 103 access to the first distributed ledger (e.g., the main blockchain).

At step 209, the enterprise user device 103 may access the requested forensics data (e.g., by accessing the first distributed ledger). In some instances, in accessing the requested forensics data, the enterprise user device 103 may modify the requested forensics data. In other instances, the enterprise user device 103 might not modify the requested forensics data. In some instances, the enterprise user device 103 may receive user input and/or automatically record notes indicating how the enterprise user device 103 accessed the requested forensics data and/or why the requested forensics data was accessed.

Figure 2C:
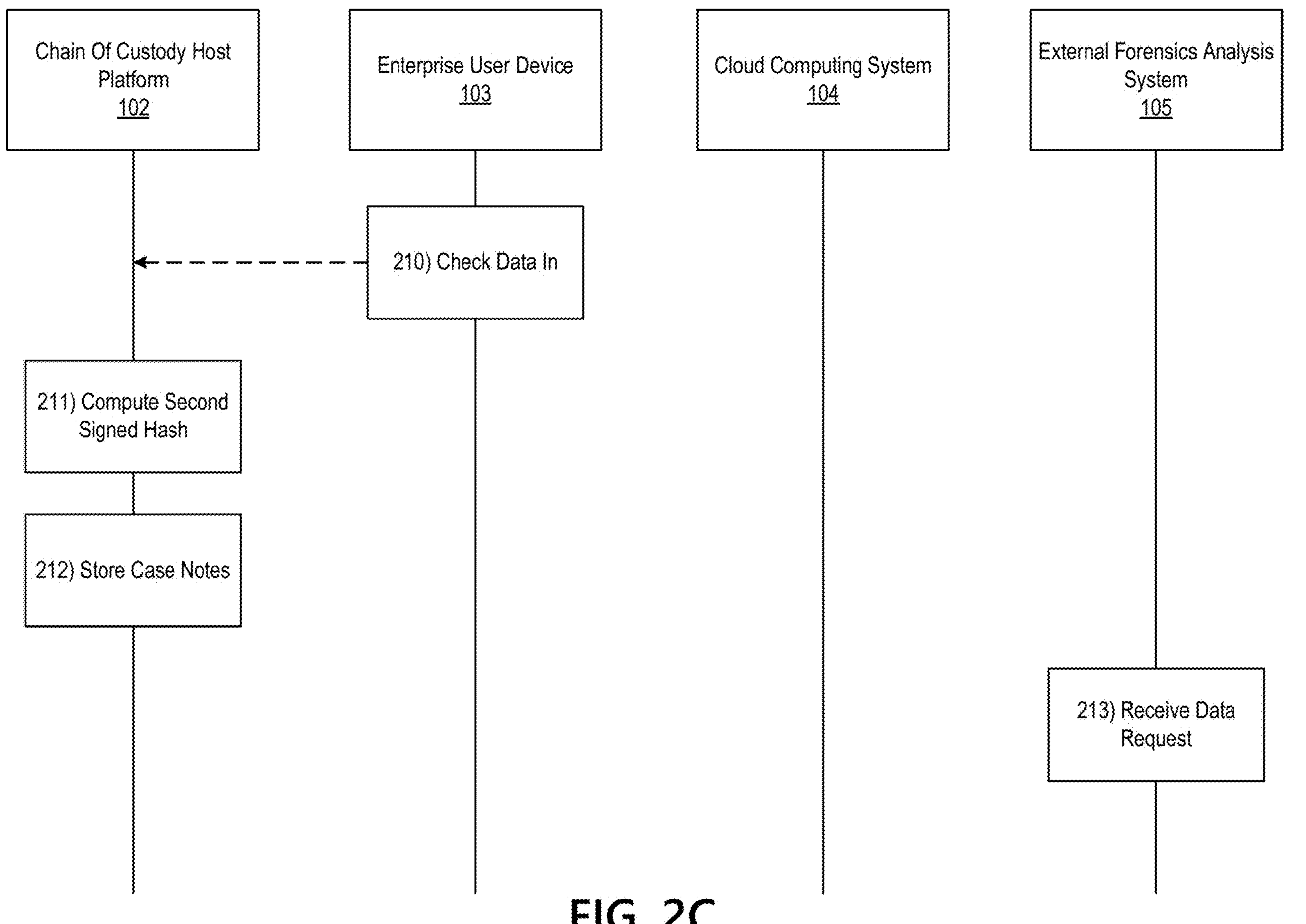

Referring to FIG. 2C, at step 210, the enterprise user device 103 may check the requested forensics data back in to the first distributed ledger. For example, the enterprise user device 103 may check the requested forensics data in while the first wireless data connection is established.

At step 211, based on or in response to the requested forensics data being checked in at step 210, the chain of custody host platform 102 may compute a second signed hash indicating a state of the requested forensics data after being accessed by the enterprise user device 103. In some instances, the chain of custody host platform 102 may record the second signed hash in the second distributed ledger (e.g., the first sidechain). For example, the chain of custody host platform 102 may add a new block to the second distributed ledger, and may include information such as the user identifier, service identifier, system access information, notes, the second signed hash, and/or other information related to the forensics data. In some instances, the chain of custody host platform 102 may also record case notes indicating actions performed on the forensics data at the enterprise user device 103.

At step 212, the chain of custody host platform 102 may establish a third distributed ledger, linked to the first distributed ledger, and may store case notes indicating at least one reason for accessing the data by the enterprise user device 103. In doing so, the chain of custody host platform 102 may establish a second sidechain off the main blockchain.

Although steps 204-212 are described above with regard to the enterprise user device 103, the actions described at these steps may be performed between the cloud computing system 104 (e.g., between one or more physical and/or virtual machines hosted by the cloud computing system 104) and the chain of custody host platform 102 without departing from the scope of the disclosure described herein.

At step 213, the external forensics analysis system 105 may receive a request to access the forensics data. For example, the external forensics analysis system 105 may receive the request to access the forensics data via a display of the external forensics analysis system 105 (e.g., from a law enforcement officer, government investigator, or other third party investigating the forensics data).

Figure 2D:
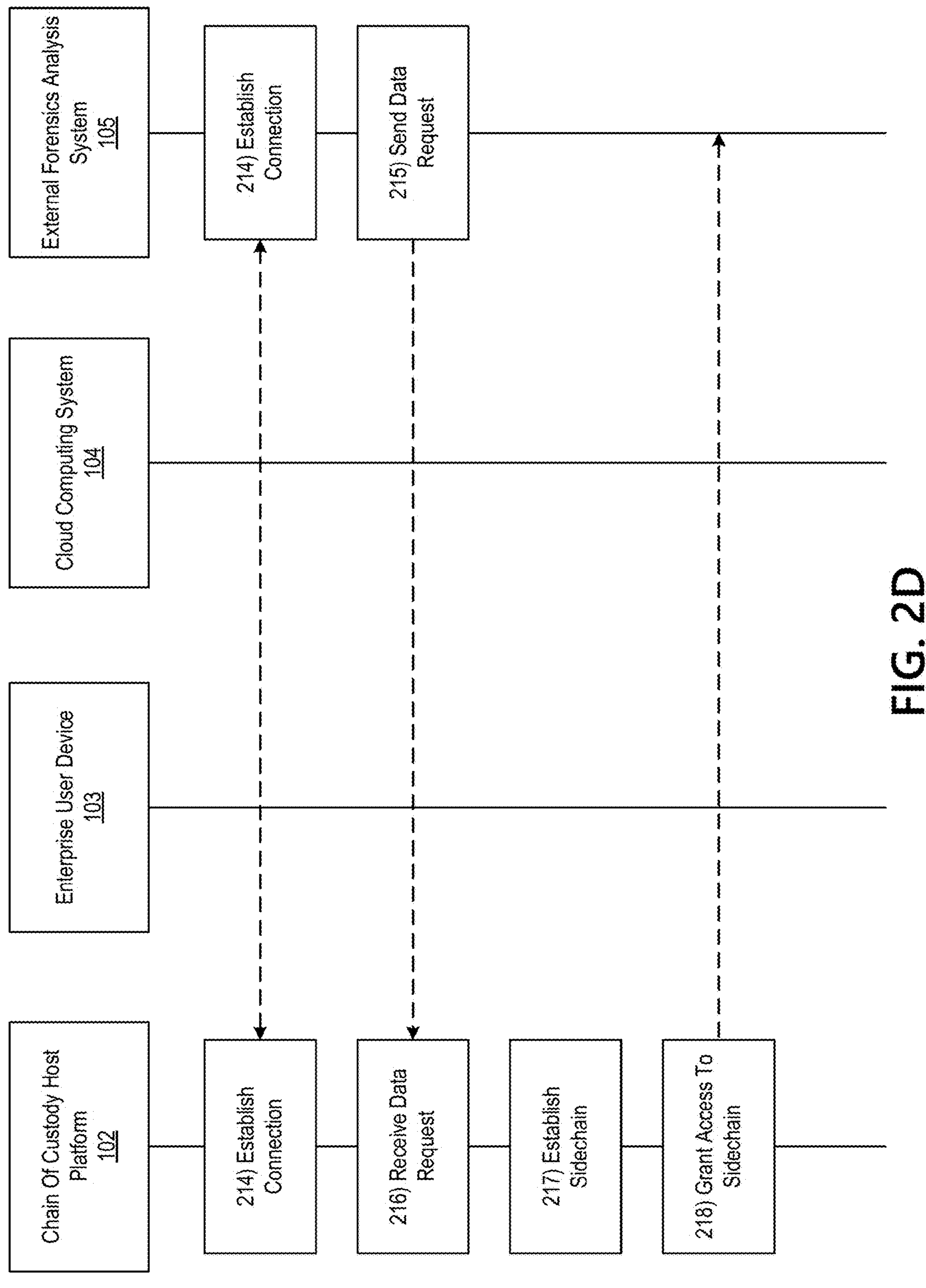

Referring to FIG. 2D, at step 214, the external forensics analysis system 105 may establish a connection with the chain of custody host platform 102. For example, the external forensics analysis system 105 may establish a third wireless data connection with the chain of custody host platform 102 to link the external forensics analysis system 105 to the chain of custody host platform 102. In some instances, the external forensics analysis system 105 may identify whether or not a connection is already established with the chain of custody host platform 102. If a connection is already established with the chain of custody host platform 102, the external forensics analysis system 105 might not re-establish the connection. If a connection is not yet established with the chain of custody host platform 102, the external forensics analysis system 105 may establish the third wireless data connection as described herein.

At step 215, the external forensics analysis system 105 may send a request for the forensics data to the chain of custody host platform 102. For example, the external forensics analysis system 105 may send the request for the forensics data to the chain of custody host platform 102 while the third wireless data connection is established. In some instances, the external forensics analysis system 105 may request, in full or in part, the same forensics data accessed by the enterprise user device 103 at step 209.

At step 216, the chain of custody host platform 102 may receive the request for the forensics data sent at step 215. For example, the chain of custody host platform 102 may receive the request for the forensics data via the communication interface 113 and while the third wireless data connection is established.

At step 217, based on or in response to the request for the forensics data received at step 216, the chain of custody host platform 102 may establish a fourth distributed ledger linked to the first distributed ledger. For example, the chain of custody host platform 102 may establish a third sidechain (e.g., linked to the main blockchain) that includes the forensics data, the chain of custody information indicating actions performed on the forensics data, the chain of custody information indicating at least one reason for accessing the forensics data, the first signed hash, the second signed hash, and/or other chain of custody information related to the forensics data.

By establishing these additional distributed ledgers (e.g., the second, third, and fourth distributed ledgers), the chain of custody host platform 102 may effectively break the stored information into different chunks that may be individually processed so as to not overwhelm processing power of the chain of custody host platform 102 and to improve efficiency of any data processing.

At step 218, the chain of custody host platform 102 may grant the external forensics analysis system 105 access to the fourth distributed ledger. In doing so, the chain of custody host platform 102 may grant the external forensics analysis system 105 access to the forensics data and a corresponding chain of custody that may be attested too as being verified even though the forensics data may have been accessed (e.g., by the enterprise user device 103 at step 209).

For example, the chain of custody host platform 102 may grant the external forensics analysis system 105 access to the fourth distributed ledger while the third wireless data connection is established. In some instances, granting the external forensics analysis system 105 access to the fourth distributed ledger may cause the external forensics analysis system 105 to display a graphical user interface as described below at step 219.

Figure 2E:
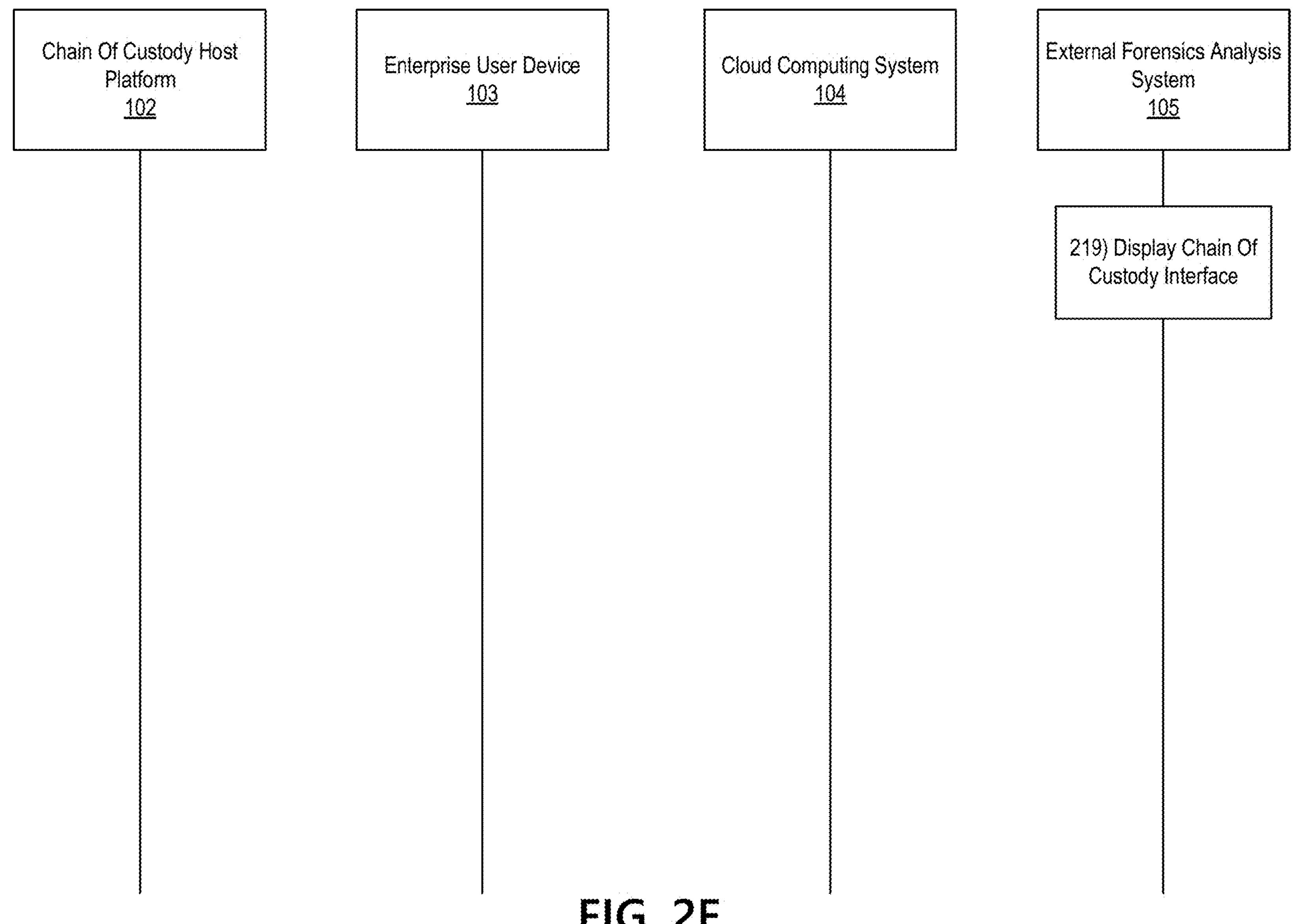

Referring to FIG. 2E, at step 219, the external forensics analysis system 105 may display a chain of custody interface based on the information from the fourth distributed ledger. For example, the external forensics analysis system 105 may display a graphical user interface similar to graphical user interface 305, which is shown in FIG. 3, which shows chain of custody information for the requested forensics data.

Although steps 201-219 as described above primarily refer to a chain of custody host platform 102, these steps may be performed and/or hosted by one or more computer/software processes without departing from the scope of this disclosure.

Figure 4:
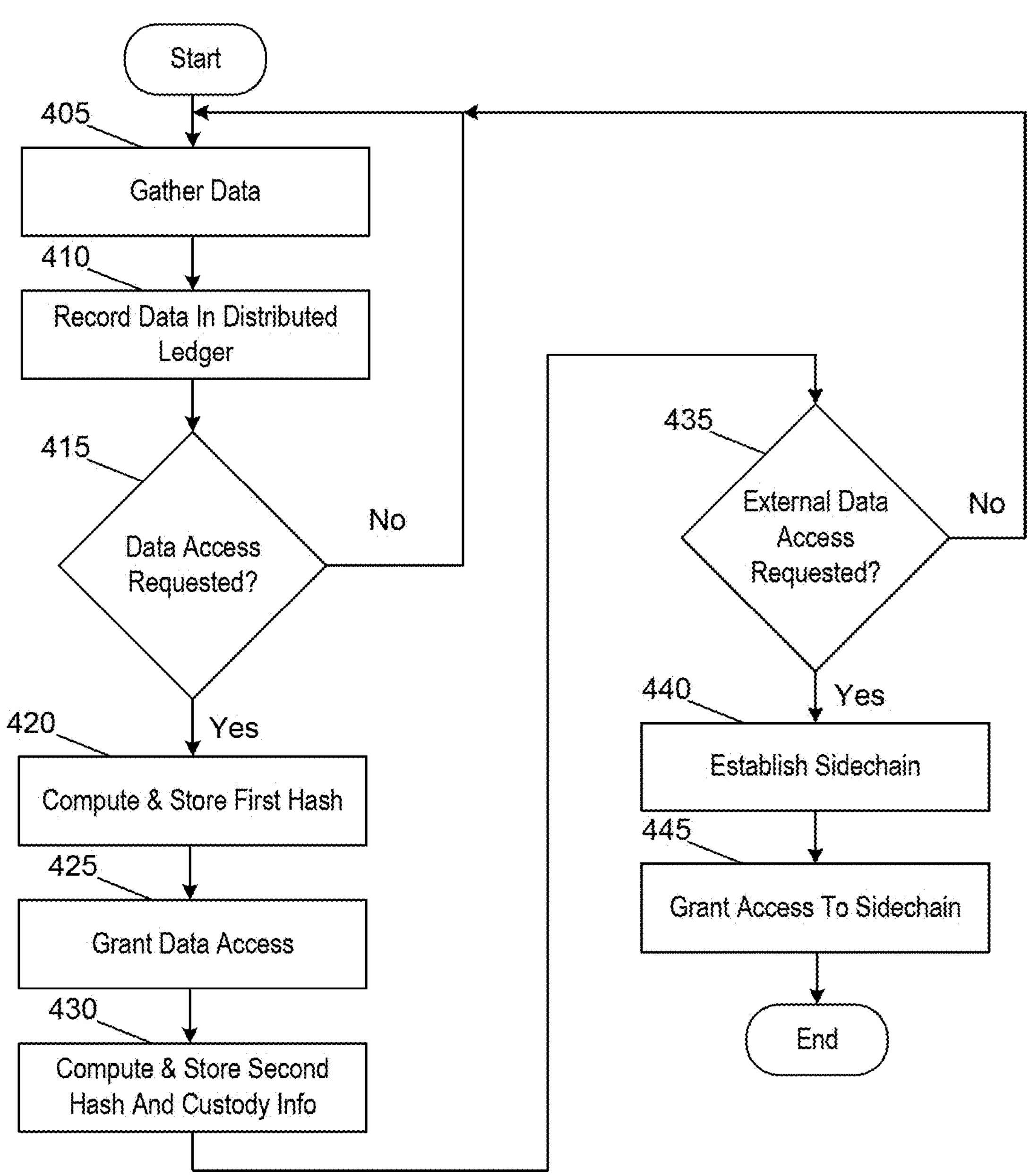
FIG. 4 depicts an illustrative graphical user interface for implementing distributed ledgers for enhanced certification of chain of custody data in accordance with one or more example embodiments.

FIG. 4 depicts an illustrative method for implementing distributed ledgers for enhanced certification of chain of custody data in accordance with one or more example embodiments. Referring to FIG. 4, at step 405, a computing platform having at least one processor, a communication interface, and memory may gather forensics data. At step 410, the computing platform may record the forensics data in a first distributed ledger. At step 415, the computing platform may determine if access to the forensics data has been requested. If the computing platform determines that data access has not been requested, the computing platform may return to step 405. If the computing platform determines that data access is requested, the computing platform may proceed to step 420.

At step 420, the computing platform may compute and store a first hash of the forensics data. At step 425, the computing platform may grant access to the forensics data. At step 430, the computing platform may compute and store a second hash of the forensics data and chain of custody information in a second distributed ledger and/or third distributed ledger. At step 435, the computing platform may determine whether external data access has been requested. If the computing platform determines that external data access has not been requested, the computing platform may return to step 405. If the computing platform determines that external data access has been requested, the computing platform may proceed to step 440.

At step 440, the computing platform may establish a fourth distributed ledger that includes the information stored in the first, second, and third distributed ledger. At step 445, the computing platform may grant access to the fourth distributed ledger.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

establish, using the at least one processor and within a predetermined period of time of receiving forensics data, a first distributed ledger that includes the forensics data;

compute, using the at least one processor, a first hash of the forensics data indicating a state of the forensics data prior to being accessed by an enterprise user device;

record, using the at least one processor and in a second distributed ledger linked to the first distributed ledger, the first hash;

grant the enterprise user device access to the forensics data;

compute, using the at least one processor, a second hash of the forensics data indicating a state of the forensics data after being accessed by the enterprise user device;

record, using the at least one processor and in the second distributed ledger, the second hash and second chain of custody information indicating at least one reason for accessing the forensics data; and record, using the at least one processor and in a third distributed ledger linked to the first distributed ledger, first chain of custody information indicating actions performed on the forensics data, wherein the second distributed ledger and the third distributed ledger comprise respective sidechains off the first distributed ledger, and wherein the sidechains break the forensics data, the at least one reason for accessing the forensics data, and the first chain of custody information indicating the actions performed on the forensics data into individually processable data chunks sufficient for processing by limited resources of the computing platform, and wherein:

the individually processable data chunks may be processed in a first period of time, an aggregation of the individually processable data chunks may be processed in a second period of time, and the first period of time is less than the second period of time.

2. The computing platform of claim 1, wherein the memory stores additional computer-readable instructions that, when executed by the at least one processor, further cause the computing platform to:

receive, from an external forensics analysis system, a request to access the forensics data; and grant the external forensics analysis system access to the forensics data, the first chain of custody information, and the second chain of custody information, wherein granting the external forensics analysis system access to the forensics data, the first chain of custody information, and the second chain of custody information causes the external forensics analysis system to display the forensics data, the first chain of custody information, and the second chain of custody information.

3. The computing platform of claim 2, wherein granting the external forensics analysis system access to the forensics data along with the chain of custody information comprises:

recording, in a fourth distributed ledger linked to the first distributed ledger, the forensics data, the first chain of custody information indicating actions performed on the forensics data, the second chain of custody information indicating at least one reason for accessing the forensics data, the first hash, and the second hash; and granting the external forensics analysis system access to the fourth distributed ledger.

4. The computing platform of claim 2, wherein the external forensics analysis system is configured to be used by a law enforcement agency.

5. The computing platform of claim 1, wherein the computing platform and the enterprise user device are operating on an internal enterprise network.

6. The computing platform of claim 1, wherein the forensics data is received using one or more automated data gathering methods.

7. The computing platform of claim 1, wherein the memory stores additional computer-readable instructions that, when executed by the at least one processor, further cause the computing platform to:

receive, from the enterprise user device, a request to access the forensics data, wherein the request to access the forensics data corresponds to one or more of a request for an encryption key, a request to decrypt a disk, a request to identify a user, a request to identify a system, a request to modify the forensics data, carving out disc abnormalities to identify broken virtual disks, or a request to identify a timestamp.

8. The computing platform of claim 1, wherein the memory stores additional computer-readable instructions that, when executed by the at least one processor, further cause the computing platform to:

receive, from the enterprise user device, a request to access the forensics data, wherein the request to access the forensics data is received during the execution of an automated task comprising one or more of: finding encryption keys, decrypting a disc, finding user identifiers, finding system identifiers, recording data modifications, carving out abnormalities in discs to identify broken virtual discs or files, finding common timestamps, or validating tasks.

9. The computing platform of claim 1, wherein granting the enterprise user device access to the forensics data comprises causing the enterprise user device to display a graphical user interface that includes chain of custody information for the forensics data.

10. The computing platform of claim 1, wherein the memory stores additional computer-readable instructions that, when executed by the at least one processor, further cause the computing platform to:

receive, from one or more virtual computing devices, the forensics data, wherein the forensics data includes one or more of memory disks, new write information, instructions, or screenshots.

11. The computing platform of claim 1, wherein the first distributed ledger is established at substantially a same time as the forensics data is received.

12. The computing platform of claim 1, wherein the memory stores additional computer-readable instructions that, when executed by the at least one processor, further cause the computing platform to:

receive, from an enterprise user device, the first chain of custody information indicating the actions performed on the forensics data and the second chain of custody information indicating at least one reason for accessing the forensics data.

13. A method comprising:

at a computing platform comprising at least one processor, a communication interface, and memory:

establishing, by the at least one processor and within a predetermined period of time of receiving forensics data, a first distributed ledger that includes the forensics data;

computing, by the at least one processor, a first hash of the forensics data indicating a state of the forensics data prior to being accessed by an enterprise user device;

recording, by the at least one processor and in a second distributed ledger linked to the first distributed ledger, the first hash;

granting, by the at least one processor, the enterprise user device access to the forensics data;

computing, by the at least one processor, a second hash of the forensics data indicating a state of the forensics data after being accessed by the enterprise user device;

recording, by the at least one processor and in the second distributed ledger, the second hash and second chain of custody information indicating at least one reason for accessing the forensics data; and recording, by the at least one processor and in a third distributed ledger linked to the first distributed ledger, first chain of custody information indicating actions performed on the forensics data, wherein the second distributed ledger and the third distributed ledger comprise respective sidechains off the first distributed ledger, and wherein the sidechains break the forensics data, the at least one reason for accessing the forensics data, and the first chain of custody information indicating the actions performed on the forensics data into individually processable data chunks sufficient for processing by limited resources of the computing platform, and wherein:

the individually processable data chunks may be processed in a first period of time, an aggregation of the individually processable data chunks may be processed in a second period of time, and the first period of time is less than the second period of time.

14. The method of claim 13, further comprising:

receiving, by the at least one processor and from an external forensics analysis system, a request to access the forensics data; and granting the external forensics analysis system access to the forensics data, the first chain of custody information, and the second chain of custody information, wherein granting the external forensics analysis system access to the forensics data, the first chain of custody information, and the second chain of custody information causes the external forensics analysis system to display the forensics data, the first chain of custody information, and the second chain of custody information.

15. The method of claim 14, wherein granting the external forensics analysis system access to the forensics data along with the chain of custody information comprises:

recording, in a fourth distributed ledger linked to the first distributed ledger, the forensics data, the first chain of custody information indicating actions performed on the forensics data, the second chain of custody information indicating at least one reason for accessing the forensics data, the first hash, and the second hash; and granting the external forensics analysis system access to the fourth distributed ledger.

16. The method of claim 14, wherein the external forensics analysis system is configured to be used by a law enforcement agency.

17. The method of claim 13, wherein the computing platform and the enterprise user device are operating on an internal enterprise network.

18. The method of claim 13, wherein the forensics data is received using one or more automated data gathering methods.

19. The method of claim 13, further comprising:

receiving, from the enterprise user device, a request to access the forensics data, wherein the request to access the forensics data corresponds to one or more of a request for an encryption key, a request to decrypt a disk, a request to identify a user, a request to identify a system, a request to modify the forensics data, carving out disc abnormalities to identify broken virtual disks, or a request to identify a timestamp.

20. One or more non-transitory computer-readable media storing instructions that, when executed by a computing platform comprising at least one processor, a communication interface, and memory, cause the computing platform to:

establish, using the at least one processor and within a predetermined period of time of receiving forensics data, a first distributed ledger that includes the forensics data;

receive, from an enterprise user device, a request to access the forensics data;

compute, using the at least one processor, a first hash of the forensics data indicating a state of the forensics data prior to being accessed by an enterprise user device;

record, using the at least one processor and in a second distributed ledger linked to the first distributed ledger, the first hash;

grant the enterprise user device access to the forensics data;

compute, using the at least one processor, a second hash of the forensics data indicating a state of the forensics data after being accessed by the enterprise user device;

record, using the at least one processor and in the second distributed ledger, the second hash and second chain of custody information indicating at least one reason for accessing the forensics data; and record, using the at least one processor and in a third distributed ledger linked to the first distributed ledger, first chain of custody information indicating actions performed on the forensics data, wherein the second distributed ledger and the third distributed ledger comprise respective sidechains off the first distributed ledger, and wherein the sidechains break the forensics data, the at least one reason for accessing the forensics data, and the first chain of custody information indicating the actions performed on the forensics data into individually processable data chunks sufficient for processing by limited resources of the computing platform, and wherein:

the individually processable data chunks may be processed in a first period of time, an aggregation of the individually processable data chunks may be processed in a second period of time, and the first period of time is less than the second period of time.

* * * * *